US008565070B2

(12) United States Patent
Harper et al.

(10) Patent No.: US 8,565,070 B2
(45) Date of Patent: Oct. 22, 2013

(54) SYSTEM AND METHOD FOR ACTIVE GEOGRAPHIC REDUNDANCY

(75) Inventors: Matthew H. Harper, Salem, NH (US); Rajesh Ramankutty, Nashua, NH (US); Greg Cheever, Hampstead, NH (US); Sanil Kumar Puthiyandyil, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 11/731,920

(22) Filed: Apr. 2, 2007

(65) Prior Publication Data

US 2007/0253328 A1    Nov. 1, 2007

Related U.S. Application Data

(63) Continuation-in-part of application No. 11/286,050, filed on Nov. 23, 2005.

(60) Provisional application No. 60/788,242, filed on Mar. 31, 2006.

(51) Int. Cl.
*H04J 3/14* (2006.01)

(52) U.S. Cl.
USPC ........... 370/219; 370/216; 370/217; 370/220; 370/221

(58) Field of Classification Search
USPC ......... 370/219, 220, 216, 217, 218, 221, 476, 370/474, 494
See application file for complete search history.

(56) References Cited

U.S. PATENT DOCUMENTS

| 6,195,705 | B1 * | 2/2001 | Leung | 709/245 |
|---|---|---|---|---|
| 6,487,605 | B1 * | 11/2002 | Leung | 709/245 |
| 6,621,810 | B1 * | 9/2003 | Leung | 370/338 |
| 6,700,868 | B2 * | 3/2004 | Smith et al. | 370/217 |

(Continued)

FOREIGN PATENT DOCUMENTS

| EP | 1783979 A1 * | 5/2007 |
|---|---|---|
| JP | 2001-236257 A | 8/2001 |

(Continued)

OTHER PUBLICATIONS

"Service Gateway—RedBack SmartEdge 800,"2005, FALCON communications, Inc.<<http://www.falconcommunications.com/partners/redback3.htm>>.*

(Continued)

*Primary Examiner* — Kibrom T Hailu
*Assistant Examiner* — Zewdu A Beyen
(74) *Attorney, Agent, or Firm* — Wilmer Cutler Pickering Hale and Dorr LLP

(57) ABSTRACT

Systems and methods are provided that allow voice and data traffic to be shifted from one chassis to other chassis without interrupting service. Geographic Redundancy (GR) is an inter-chassis redundancy, where the chassis may be a home agent, a packet data serving node, or any combination of wireless networking devices. Additionally, each chassis can have one or more partitions that handle subscriber session traffic and a corresponding redundant partition on a different chassis. The redundant chassis partition can take over all or a portion of the functionality of the active chassis partition if the active chassis or any critical peer servers/gateways communicating with the active chassis should fail. This provides users with uninterrupted service in the case of some failures.

19 Claims, 8 Drawing Sheets

(56) References Cited

U.S. PATENT DOCUMENTS

| | | | |
|---|---|---|---|
| 6,771,623 B2 | 8/2004 | Ton et al. | |
| 6,788,204 B1 | 9/2004 | Ianelli et al. | |
| 6,795,705 B1 * | 9/2004 | Warrier et al. | 455/435.1 |
| 6,799,204 B1 | 9/2004 | Baba et al. | |
| 7,080,151 B1 * | 7/2006 | Borella et al. | 709/230 |
| 7,173,917 B1 | 2/2007 | Narayanan et al. | |
| 7,227,863 B1 | 6/2007 | Leung et al. | |
| 7,269,133 B2 * | 9/2007 | Lu et al. | 370/219 |
| 7,340,168 B2 | 3/2008 | Giles et al. | |
| 7,340,169 B2 | 3/2008 | Ovadia et al. | |
| 7,457,882 B2 * | 11/2008 | Stewart et al. | 709/230 |
| 7,480,737 B2 | 1/2009 | Chauffour et al. | |
| 7,657,260 B2 | 2/2010 | Meng | |
| 7,827,307 B2 | 11/2010 | Lehrschall et al. | |
| 8,223,687 B2 | 7/2012 | Cheever et al. | |
| 2001/0021175 A1 | 9/2001 | Haverinen | |
| 2002/0010865 A1 | 1/2002 | Fulton et al. | |
| 2002/0067704 A1 | 6/2002 | Ton | |
| 2002/0080752 A1 | 6/2002 | Johansson et al. | |
| 2002/0165944 A1 * | 11/2002 | Wisner et al. | 709/220 |
| 2002/0184387 A1 | 12/2002 | Yamaya et al. | |
| 2003/0056138 A1 | 3/2003 | Ren | |
| 2003/0073439 A1 | 4/2003 | Wenzel et al. | |
| 2003/0182433 A1 * | 9/2003 | Kulkarni et al. | 709/228 |
| 2004/0066749 A1 * | 4/2004 | Watanabe | 370/242 |
| 2004/0083403 A1 | 4/2004 | Khosravi | |
| 2004/0090941 A1 | 5/2004 | Faccin et al. | |
| 2004/0095881 A1 | 5/2004 | Borella et al. | |
| 2004/0202126 A1 | 10/2004 | Leung et al. | |
| 2005/0207382 A1 * | 9/2005 | Hirashima et al. | 370/338 |
| 2005/0207429 A1 * | 9/2005 | Akita et al. | 370/401 |
| 2005/0281194 A1 | 12/2005 | Sonoda | |
| 2006/0174039 A1 * | 8/2006 | Stewart et al. | 709/245 |
| 2007/0066273 A1 | 3/2007 | Laroia et al. | |
| 2007/0066329 A1 | 3/2007 | Laroia et al. | |
| 2007/0116019 A1 | 5/2007 | Cheever et al. | |
| 2007/0165516 A1 * | 7/2007 | Xu et al. | 370/217 |
| 2007/0245167 A1 * | 10/2007 | De La Cruz et al. | 714/4 |
| 2007/0253328 A1 | 11/2007 | Harper et al. | |

FOREIGN PATENT DOCUMENTS

| | | |
|---|---|---|
| WO | WO-00/45560 | 8/2000 |
| WO | WO-03/085540 | 10/2003 |
| WO | WO-2003107698 A1 | 12/2003 |

OTHER PUBLICATIONS

International Search Report and Written Opinion issued for corresponding International Patent Application No. PCT/US2007/008302.

File History for U.S. Appl. No. 11/286,050.

File History for U.S. Appl. No. 11/286,049.

* cited by examiner

SYSTEM AND METHOD FOR ACTIVE GEOGRAPHIC REDUNDANCY

CROSS-REFERENCE TO RELATED APPLICATIONS

This application claims benefit under 35 U.S.C. §119(e) of U.S. Provisional Patent Application No. 60/788,242, entitled "A System and Method for Active Geographic Redundancy," filed Mar. 31, 2006, which is hereby incorporated by reference herein in its entirety. This application is a continuation-in-part of U.S. patent application Ser. No. 11/286,050, entitled "A Method for Providing Home Agent Geographic Redundancy via a Service Redundancy Protocol," filed Nov. 23, 2005. This application is related to U.S. patent application Ser. No. 11/286,049, entitled "A Method for Providing Home Agent Geographic Redundancy," filed Nov. 23, 2005.

FIELD OF THE DISCLOSURE

This invention relates to a system and method for providing redundancy in a wireless network. More particularly, two or more chassis in a wireless network are configured to provide backup capabilities to other chassis in the network.

BACKGROUND

Wireless networks provide users with voice and data information without the need for a wired line tethering the user to a certain location. A wireless network is typically composed of a mobile device, base stations, and a supporting infrastructure. The mobile device can be, for example, a cell phone, a PDA, or a computer with wireless capabilities. These mobile devices interact with base stations that transmit and receive data. The base stations can further be connected to a network infrastructure that connects to the public switched telephone network (PSTN), the Internet, and/or other communication networks.

While cellular wireless communication systems were originally designed to transmit voice communications, increasingly these networks have been modified to also support data communications, such as packet based data communications. Mobile IP, a form of packet based data communication, enables mobile devices to change where they are connecting to the Internet without changing their Internet Protocol (IP) address. Various agents assist in the transmission of packets from a mobile device to the Internet. A Home Agent performs the mobility management functions needed for IP communications on behalf of the mobile device. Mobile devices get the Home Agent address either through a static configuration, where the IP address of the Home Agent is hard-coded in the mobile device, or through a mobile IP registration process.

When a registration process is used, a server is responsible for assigning Home Agents to mobile devices. In either the static assignment or the server registration of a mobile device with a Home Agent, it is important that the assigned Home Agent is fully functional. Therefore, it is highly desirable to provide redundancy so that a fully functionally chassis, which may be a home agent, is always available for a mobile device.

SUMMARY OF THE DISCLOSURE

Certain embodiments of the present invention provide a chassis, which includes at least one of a home agent, a packet data serving node, an Authentication, Authorization, and Accounting server, a Base Station Controller, a packet control function, or any other wireless network device, that can shift voice and/or data sessions to another chassis without interrupting the subscriber sessions or call sessions. The chassis communicate with each other to provide the information necessary to handle each other's subscriber sessions so that in the event of a failure another chassis can assume control of the subscriber sessions on a failed chassis. This is done, in some embodiments by one chassis advertising itself as the other chassis which has shut down. In certain embodiments, partitions are used on a chassis to divide the resources available on a chassis and certain partitions that are in an active state handle subscriber sessions while other partitions wait in a standby state. In the event of an active state partition failing on a chassis, the subscriber sessions can be switched over to a standby partition on another chassis.

Certain embodiments feature a system comprising a first chassis including a first partition and a second partition and a second chassis in operable communication with the first chassis and including a first partition and a second partition. The first partition of the first chassis accepting subscriber session traffic and sending at least one update to the first partition of the second chassis, and the first partition of the second chassis maintaining subscriber session information corresponding to subscriber session information on the first partition of the first chassis.

Some embodiments feature a method comprising receiving subscriber session traffic at a first partition in a first chassis, sending a checkpoint message to update a first partition in a second chassis with information from the first partition in the first chassis, initiating a switchover event where the first partition in the second chassis advertises a common loopback address that is shared with the first partition in the first chassis, and processing subscriber session traffic received at the first partition in the second chassis using information received in the checkpoint message.

DETAILED DESCRIPTION OF THE DISCLOSURE

Figure 1:
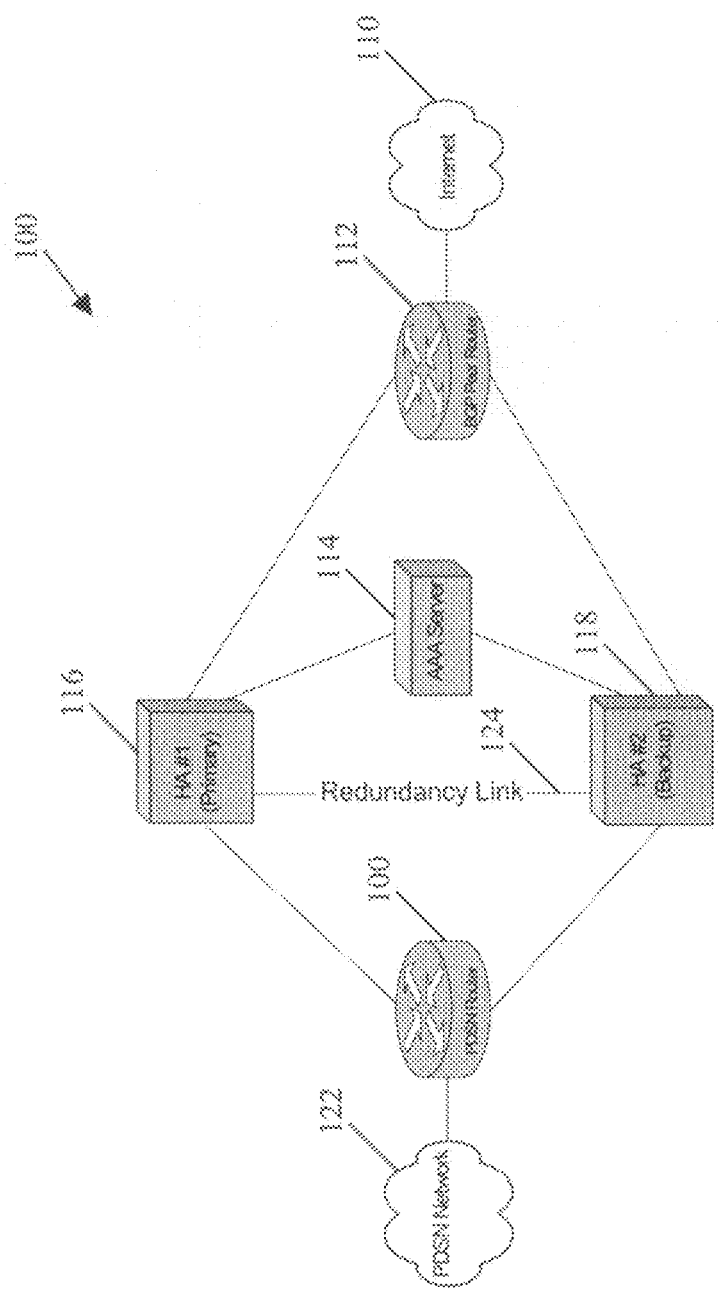
FIG. 1 is a logical network diagram in accordance with certain embodiments of the invention.

Systems and methods are provided that allow subscriber session traffic to be shifted from one chassis to other chassis without interrupting the subscriber session. Geographic Redundancy (GR) is an inter-chassis redundancy, where the chassis may be a home agent, a packet data serving node, or any combination of wireless networking devices. In some embodiments, each chassis has one or more partitions that handle subscriber session traffic and a redundant partition on a different chassis is deployed for every active partition on a chassis. The redundant chassis partition can take over all or a portion of the functionality of the active chassis partition if the active chassis or any critical peer servers/gateways communicating with the active chassis should fail. Existing calls in the failed chassis may be transferred in a switchover and recreated in the redundant chassis when it takes over the role of the active chassis. Certain IP addresses are also transferred to the new active chassis from the failed chassis during a switchover, so that certain peer entities can maintain communication with a chassis through switchover events.

In some embodiments, an Active-Standby model is deployed on the chassis, where one chassis serves as an "active" chassis and one or more other chassis serve as a "standby" chassis and there are no partitions on the chassis. In this model, standby chassis do not handle incoming sessions or data until the chassis is activated and a switchover event occurs making the chassis "active." Another approach is to keep a number of chassis active and to switch subscriber sessions from an active chassis to another active chassis in the event of a failure. In certain embodiments, an Active-Active mode of geographic redundancy requires the same amount of total hardware as an Active-Standby mode. An advantage of the Active-Active mode is that the CPUs are utilized in both chassis when both chassis are active, resulting in improved performance throughput, data latency etc. A Service Redundancy Protocol (SRP) can be used to manage the Active-Active mode as well as the Active-Standby mode chassis.

In some embodiments, Active-Active chassis perform load sharing by some external mechanism. This external mechanism can also be used to allow more than two chassis to share call load in the event of another chassis failing. When chassis are running Active-Active load shared mode, chassis can restrict the call load to pre-defined limits. Traps and event logs may be generated when it exceeds the limit. Also the command line interface can be used to show the current load status related to geographic redundancy. Optionally, the external mechanism sets the related services in overload state, so that new incoming calls can be rejected or redirected. This external mechanism can be another chassis, a personal computer, or a terminal interface into the chassis. The external mechanism may also allow short bursts of activity on an Active-Active chassis above the set operating range increasing performance and handling.

Before discussing Active-Active model, the Active-Standby model is explained in greater detail. In the following discussions, home agent service is taken as the service from the chassis, however, one practiced in the field would appreciate that the following examples could be expanded to other types of service, such as a packet data switching node.

FIG. 1 illustrates a logical network diagram 100 for an active-standby redundancy system where a chassis is configured as a home agent in accordance with certain embodiments. Illustrated system 100 includes Internet 110, a Border Gateway Protocol (BGP) Router 112, an Authentication, Authorization, and Accounting (AAA) Server 114, a Home Agent (HA#1) 116, a Home Agent (HA#2) 118, a Packet Data Switched Network (PDSN) Router 120, a PDSN Network 122, and a redundancy link 124. As may be appreciated by one practiced in the field, system 100 may contain additional network equipment as is needed in a network to provide the level of service desired. Generally speaking, BGP is a system routing protocol that is commonly used to exchange routing information for the Internet between Internet service providers. BGP Router 112 may be used to propagate Internet Protocol (IP) information throughout the routing domain and Internet 110.

As illustrated, AAA Server 114 can interact with HA#1 116 and HA#2 118 to handle mobile device requests for access to network resources. In some embodiments, AAA Server 114 communicates with a Remote Authentication Dial-In User Service (RADIUS) Server to authenticate and authorize access to system resources. Illustrated HA#1 116 is the primary Home Agent and actively handles IP communications, while HA#2 118 is a backup Home Agent. As shown, HA#1 116 and HA#2 118 are connected by a redundancy link 124 that provides a channel for passing information and allows the two Home Agents to switch states. The two Home Agents, HA#1 116 and HA#2 118, are connected to PDSN 120. PDSN 120 may forward data packets through PDSN Network 122 and eventually to the mobile device requesting the data.

In an Active-Standby redundancy system, at least one chassis may be configured in a primary configuration and at least one may be configured in a backup configuration. In FIG. 1, the primary Home Agent, HA#1 116, can provide Home Agent services during normal operating conditions. Likewise, the backup Home Agent, HA#2 118, can provide Home Agent services during failure conditions. When a Home Agent is providing services it is considered "active," and when the Home Agent is not providing services it is considered "standby." An inter-Home-Agent communication channel, for example redundancy link 124, may be used to allow the Home Agents to communicate to determine the state of the Home Agents and redundancy link 124 can be provided by the existing network infrastructure. In some embodiments of the invention, the "standby" Home Agent may not switch to "active" unless a failure is detected. In other embodiments, the Home Agents may switched manually for performing, for example, maintenance or upgrades to one of the Home Agents.

In some embodiments of the present invention, the service redundancy protocol used by the Home Agents is a networking protocol based on a transfer control protocol (TCP) that can provide a communication channel between a primary and a backup Home Agent. The communication channel may allow the Home Agents to determine the peer Home Agent state, to validate peer Home Agent configuration, and to synchronize subscriber session information. In certain embodiments, a service redundancy protocol (SRP) can be implemented as a centralized control/distributed session model with a SRP Manager or VPN Manager handling various aspects of the communication. The SRP Manager can be a single hardware or software process that reads incoming and forms outgoing SRP control messages including a Hello message and various configuration validation messages. The SRP Manager can also be responsible for determining the Active/Standby state of the Home Agent.

In some embodiments, multiple processes called SRP Session Managers act as distributed agents and communicate subscriber session information to the redundant Home Agent peer. The peer SRP Session Managers on the redundant Home Agent may be responsible for receiving this information and creating a redundant session for use in the event of a switchover. The SRP Manager can communicate Home Agent state and SRP protocol configuration information to the SRP Session Managers. This information can provide each SRP Session Manager with the ability to contact the remote Home Agent and synchronize the current subscriber sessions through the use of service checkpoint messages.

In certain embodiments of the present invention, SRP Hello Messages are sent by both Home Agents in a redundant grouping. These messages may be sent at a periodic interval, randomly, or based on conditions configured by an administrator. The Hello Messages can be used to determine the state of the remote Home Agent and to verify communication with the remote Home Agent. In some embodiments, if the Standby Home Agent has not received a valid SRP Hello Message from its peer within a dead-interval, the Home Agent can assume the Active Home Agent is not functioning, and can transition to Active and begin processing subscriber sessions.

The Hello Message may contain system attributes such as: Home Agent state, Peer State, Peer Role, Hello Interval, Priority, Priority Tiebreaker, and BGP modifier. The attributes may be appended to a TCP header and the attributes may be sized in terms of bits, and meanings can be assigned to bit combinations according the needs of the network. The Home Agent state can be the current state of the Home Agent sending the message. The Peer State can be the last known state of a peer Home Agent. The Peer Role can be the role configured for the Home Agent (e.g., primary, backup, etc.). The Hello Interval can be a user-set time period between adjacently sent Hello Messages. The Priority can be a weight assigned to a Home Agent for use in operation. The Priority Tiebreaker can be a second attribute used to determine which Home Agent should transition to Active in the case of identical priority. The BGP modifier can be an attribute used to determine how to route messages from BGP router 112.

In some embodiments, there are SRP Configuration Validation Messages. The Active Home Agent sends the SRP Configuration Validation Message to the Standby Home Agent. These messages may contain configuration information that allows the Standby Home Agent to determine if it is properly configured to assume the role of Active Home Agent. The SRP Configuration Validation Message may allow for configuration error checking, and verification that the peer Home Agent is compatible. If an error is determined to exist, the Standby Home Agent can produce an alarm so that the network operator is notified of the potential problem. The Home Agent may also maintain a configuration conflict notification mechanism to identify potential problems between peer Home Agents to an operator before a switching event occurs.

The SRP Configuration Validation Messages may contain attributes such as: Message Type, Home Agent Configuration, and Home Agent State. The Message Type can be the category of configuration message. Some examples of categories of configuration messages are loopback interface configuration, IP pool configuration, Home Agent Service IP Address, Home Agent Service configuration, and Home Agent Authentication, Authorization, and Accounting (AAA) probe configuration. The Home Agent Configuration can be the configuration parameters for the selected category of message. The Home Agent State can be the current state of the Home Agent sending the message.

In certain embodiments, there are SRP Service Checkpoint Messages. The Checkpoint Messages contain data that may describe each subscriber session being processed by the Active Home Agent and can contain fields to indicate which session the data pertains and whether to overwrite a session already stored on the Standby Home Agent. The Checkpoint Messages can create/delete redundant sessions on the Standby Home Agent. The messages can also periodically update subscriber session statistics on the Standby Home Agent. The Checkpoint Messages may contain all the information needed to recreate a call on the Standby Home Agent if the Standby Home Agent were to transition to an Active Home Agent. Another Checkpoint Message may be used to invalidate an existing session (i.e., this message is sent to the Standby Home Agent when a call is terminated on the Active Home Agent).

In some embodiments, the primary and backup Home Agents, illustrated HA#1 116 and HA#2 118 respectively, are configured with common loopback interface routes or addresses and IP Pool information. The Home Agent services run on these loopback interface routes. The loopback routes may be advertised throughout the IP routing domain, in certain embodiments, through the use of a dynamic routing protocol on the Active Home Agent. The loopback interface routes or loopback addresses are circuitless IP addresses that are not associated with a particular interface or route in some embodiments. In the event of a failure, for example, the Standby Home Agent transitions to Active and begins advertising the loopback and IP Pool routes of the formerly Active Home Agent. This may allow other elements in the network to transition to communicating with the previously Standby Home Agent without service interruption.

In order to preserve existing subscriber sessions during a switchover event, in certain embodiments, the Home Agents send messages to each other during operation. The messages may allow the Standby Home Agent to resume a session in the event that the Home Agent transitions to Active. In some embodiments, the Active Home Agent may monitor the following items to detect a possible failure: 1) dynamic routing peer connectivity; 2) AAA server connectivity; 3) Standby Home Agent connectivity; 4) internal software state. In the event one of these items fails, the Active Home Agent may initiate a switchover event allowing the Standby Home Agent to transition to Active and avoid a service interruption to any existing or new subscribers.

Active and standby chassis are connected by a redundancy link and a Service Redundancy Protocol (SRP) can be used over the link to monitor and control the chassis state. The redundancy link 124 may be implemented using existing network links between and among the chassis. The chassis also monitors the state of Authentication, Authorization, and Accounting (AAA) servers and its Border Gateway Protocol router (BGP) peers.

Both active and standby chassis have "SRP-Activated" resources defined. These resources can be the same between active and standby chassis. Loopback IP addresses in ingress, egress, and AAA contexts as well as IP pools in egress contexts are usually "SRP-Activated" resources. A context is virtual IP network and also a logical partition that is developed in software to allow an IP network to be abstracted from the hardware on which it is implemented. In a chassis, which can have more than one processor and other resources, a context allows a distribution of the hardware resources without dedicating specific physical hardware to a function. In some embodiments, only active chassis enables the "SRP-Activated" resources and the standby chassis keeps the "SRP-Activated" resources disabled until the standby chassis transitions to an active state.

Context services, such as home agent services, can be configured and bound to "SRP-Activated" loopback addresses in the ingress context. The egress context can be used for IP pool configuration. AAA context can be used for RADIUS and subscriber domain configuration. SRP context can be used for configuring SRP IP address and other related parameters. In certain embodiments, ingress and egress contexts may be same context. Also AAA context can be same as ingress or egress context. Typically, though, the SRP context is a separate context.

Figure 2:
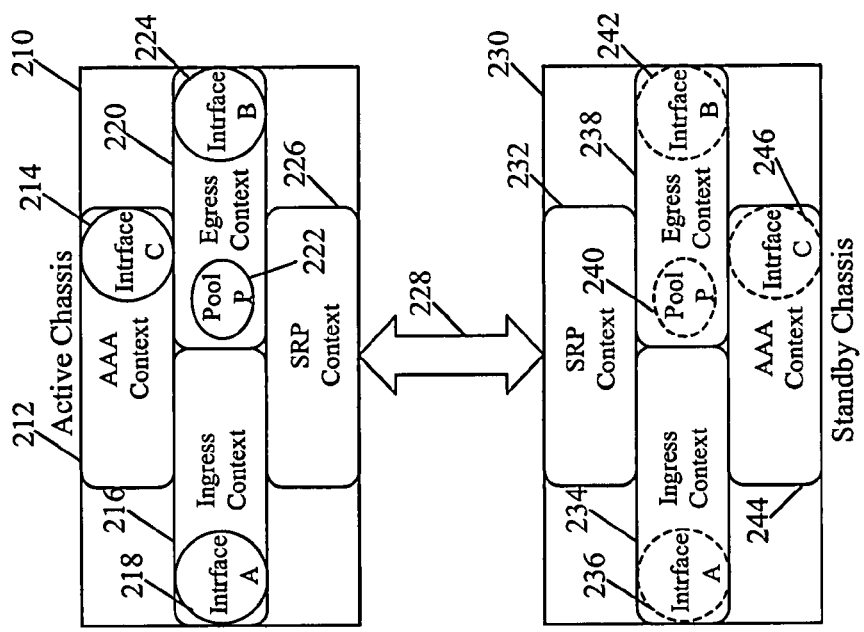
FIG. 2 is a software configuration schematic for active-standby redundancy in accordance with certain embodiments of the invention.

FIG. 2 illustrates a software configuration schematic for active-standby redundancy in accordance with certain embodiments. Active chassis 210 includes an AAA context 212, an interface C 214, an ingress context 216, an interface A 218, an egress context 220, an IP pool P 222, an interface B 224, and a service redundancy protocol (SRP) context 226. SRP communications can occur over a communication link 228, which can be a dedicated communication path or a path through the network in which active chassis 210 resides. Illustrated communication link 228 links active chassis 210 to standby chassis 230. Standby chassis 230 includes a SRP context 232, an ingress context 234, an interface A 236, an egress context 238, a IP pool P 240, an interface B 242, an AAA context 244, and an interface C 246.

Ingress context 216 has loopback interface A 218 defined, which is activated and providing one or more mobile nodes with service. Home agent service A is bound to this interface in some embodiments. Standby chassis 230 has the same interface (i.e., interface A 236) and home agent service defined, but are not activated. An interface and service are enabled only in one active chassis at any time. Interface B 224 is defined in egress context 220, which is activated in active chassis 210. Interface C 214 can also be a SRP-activated interface. When active chassis 210 fails, standby chassis 230 becomes active and enables SRP activated IP interfaces and pools, so that standby chassis 230 can function as an active chassis 210 without disrupting the sessions running on the chassis. IP pool P is an IP address pool and each pool has a range of IP address for subscriber assignment. In certain embodiments, the ranges can overlap.

In some embodiments, Active-Active chassis redundancy involves grouping resources into at least two different partitions within a chassis. These partitions are known as geographic redundancy (GR) partitions. There are two partitions within the chassis for the purposes of this example, GR partition 1 and GR partition 2. SRP activated resources belong to one of the partitions and each partition can have home agent service(s), IP pools defined, and AAA context/interface defined.

To simplify the configuration, each context with at least one SRP activated resource may be configured for either GR partition 1 or GR partition 2. Another possibility is to configure each SRP activated resource specifically into either one of the partitions. In some embodiments, SRP activated resources and partition configurations of the resources are the same between the chassis, except for the priority and primary/backup mode, which are discussed later. At any time, a particular GR partition is active in only one chassis, according to some embodiments. The corresponding GR partition remains in a standby state in another chassis.

In an example where two chassis are used, when both Active-Active chassis are running in load sharing mode, a first chassis activates GR partition 1 and a second chassis activates GR partition 2. The first chassis GR partition 2 and the second chassis GR partition 1 are in standby mode as described above. When either of the chassis fail or detect AAA Server or peer routing gateways are not reachable, the other chassis takes ownership of both GR partitions in some embodiments. That is, if active GR partition 1 on the first chassis fails, for example, standby partition 1 on the second chassis is activated and handles the subscriber sessions.

Figure 3:
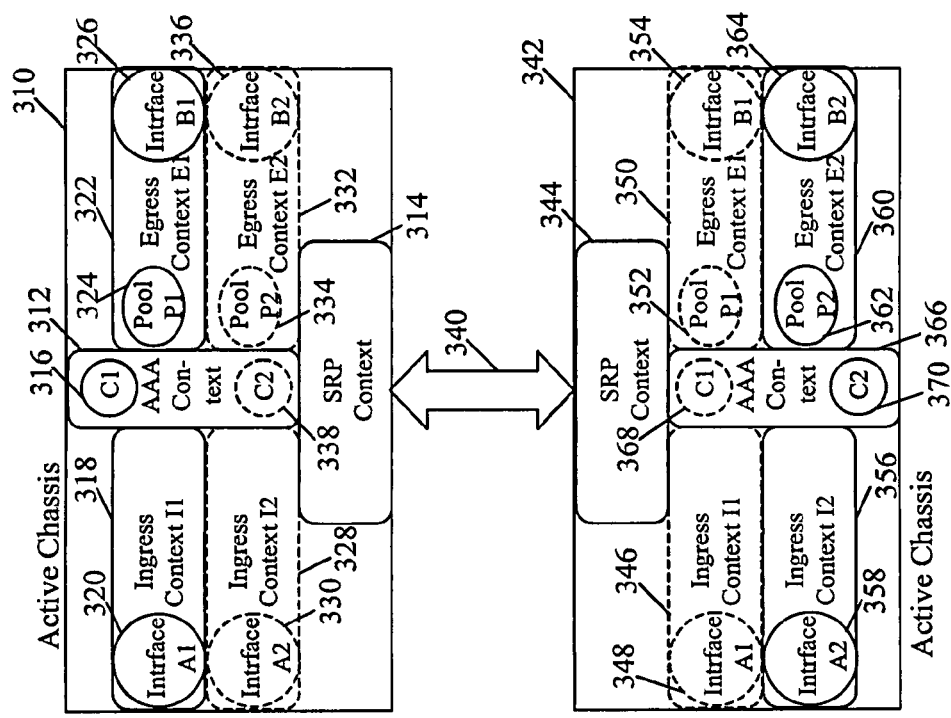
FIG. 3 is a software configuration schematic for active-active redundancy in accordance with certain embodiments of the invention.

FIG. 3 illustrates a software configuration schematic for active-active redundancy in accordance with certain embodiments. Active chassis 310 includes GR partition 1 and GR partition 2 as well as AAA context 312 and SRP context 314. GR partition 1 includes interface C1 314, ingress context I1 318, interface A1 320, egress context E1 322, pool P1 324, and interface B1 326. GR partition 2 includes ingress context I2 328, interface A2 330, egress context E2 332, pool P2 334, interface A2 336, and interface C2 338. SRP communications can occur over a communication link 340, which can be a dedicated communication path or a path through the network in which active chassis 310 resides. Illustrated communication link 340 links active chassis 310 to active chassis 342.

Active chassis 342 also includes a GR partition 1 and a GR partition 2 along with a SRP context 344 that receives communication on communication link 340. GR partition 1 of active chassis 342, in this example, corresponds to active GR partition 1 of active chassis 310. GR partition 1 of active chassis 342 is in a standby state to assume the session load of GR partition 1 of active chassis 310 should it fail. GR partition 1 of active chassis 342 includes ingress context I1 346, interface A1 348, egress context E1 350, Pool P1 352, and interface B1 354. GR partition 2 of active chassis 342 corresponds to GR partition 2 of active chassis 310, which is in a standby state with GR partition 2 of active chassis 342 handling the session loads. GR partition 2 includes ingress context I2, interface A2 358, egress context E2 360, Pool P2 362, and interface B2 364. Active chassis 342 also includes an AAA context 366 which includes a context C1 368 relating to GR partition 1 and a context C2 370 relating to GR partition 2.

Ingress context I1 and egress context E1 belong to geographical redundancy (GR) partition 1. Ingress context I2 and egress context E2 belong to GR partition 2. The first chassis has geographical redundancy partition 1 activated and the second chassis has GR partition 2 activated. This means home agent service A1 is active in the first chassis and home agent service A2 is active in the second chassis. AAA context is same for both of the partitions in this embodiment. AAA context interface C1 belongs to GR partition 1 and AAA context interface C2 belongs to GR partition 2. Some chassis configurations may use a single AAA context. Thus, it may not be possible to have two different AAA contexts for GR partitions. In such cases, two different "SRP Activated" interfaces must be created in the AAA context and assign it as primary and secondary NAS-IP addresses. In some embodiments, one interface is assigned to GR partition 1 and other assigned to GR partition 2. Further, more than one ingress context and services in one GR partition may be used. Also, one GR-partition can have multiple egress contexts.

A sample command line interface (CLI) configuration is provided below. If the mode is configured as Active-Active, then for "priority", "mode", "bgp-modifier" and "srp-switchover" command should be specified with the GR partition number in this example.

```
Configure
    Context <name>
        service-redundancy-protocol
            redundancy [ active-standby | active-active]
            bind <ip-address>
            peer-ip-address <ip address>
            hello-interval <seconds>
            configuration-interval <seconds>
            dead-interval <seconds>
            mode <primary | backup> [gr-Partition <1 | 2>]
            bgp modifier threshold <integer> [gr-Partition <1 | 2>]
            checkpoint session duration <integer>
            srp-monitor bgp context <string> <ip address>
            srp-monitor authentication-probe context <string>
```

-continued

```
            <ip-address> [port <integer>]
                #exit
    #exit
srp initiate-switchover [timeout <integer>] [gr-Partition <1 | 2>]
```

The following CLI sets the GR partition for a context. By default all SRP Activated resources in that context will use this GR partition number. This configuration may be overridden by configuration on the specific resource.

```
            Configure
                Context <name>
                    gr-Partition <1 | 2>]
                    #exit
                #exit
```

The following is a command configuration GR partition number for loopback interface.

```
Configure
    Context <name>
        Interface <name> loopback
            Ip address <addr> <mask> srp-activate [gr-partition <1|2>
            #exit
        #exit
#exit
```

The following command configuration GR partition number for IP Pools.

```
            Configure
                Context <name>
                    Ip pool ..... srp-activate [gr-partition <1|2>
                    #exit
                #exit
```

In certain embodiments of the invention, configuration validation between chassis takes place. The configuration validation scheme may be used by Active-Standby mode and by Active-Active mode.

A non-Active-Active redundant chassis can be modified to support the Active-Active redundancy model. When running a load shared Active-Active model, each chassis is expected to handle half of the total capacity of the chassis for a two chassis redundancy. In some embodiments, more than two chassis are used to implement Active-Active redundancy. The following process may be used to reconfigure a chassis:

1) Add new ingress context(s), which receive incoming subscriber session traffic. A new ingress context is created for every ingress context with home agent service and new SRP activated loopback interface binds the new home agent service.

2) Add new egress context(s), which send outgoing subscriber session traffic. A new egress context is created for every egress interface used as a destination context for a subscriber session. SRP activated loopback interface must be created in the new context.

3) Add a new AAA context or add a new loopback interface in the AAA context. If the configuration allows multiple AAA contexts, add new AAA contexts with new loopback interfaces and assign them to the partitions. Otherwise, add one more SRP activated loopback interface and assign it to the partition.

4) Partition the IP pool(s). These newly added egress context(s) may be configured with IP pools. In some embodiments, the IP pool is divided leaving a portion of IP addresses in an existing egress context and another portion of the pool addresses for the new egress context. The complexity of partitioning the IP pool depends on whether the pool is static or dynamic. Partitioning dynamic pools is straight forward because the addresses are not bound to any particular piece of equipment. Dynamic pool partitioning may cause an address starvation issue in some partitions, due to imbalance in the number of calls from some subscriber groups being serviced by the different partitions. However, this issue may be solved by allocating IP addresses in unequal amounts among the partitions. The issue may also be solved by adapting methods used in adding more active home agents to an existing network. For example, when a new home agent node is added to the network, an IP address pool is configured for all subscribers for that home agent. Some IP pool configuration/reconfiguration may be involved in this. Adding a GR partition is similar to this procedure. Partitioning static pools may require making modifications beyond the chassis because the static pools are associated with a particular home agent or entity. External changes in an AAA, a foreign agent, or another network device may need to be made to re-configure the assigning of the static pool addresses so calls with static IP address are directed to the desired home agent.

5) Configure SRP parameters for the partitions and set a partition number for the contexts. Duplicate the relevant SRP configuration to the new chassis. SRP "mode" and "priority" should be configured such a way that, GR partition 1 is activated in one chassis and GR partition 2 is activated in the other chassis if there is no failure for either chassis.

6) Connect SRP link between the chassis. This may entail simply using an IP protocol to direct messages from one chassis to the other chassis.

7) Direct calls to the new partition. This may require reconfiguring AAA server, foreign agent, routers, etc. depending on how the partition is divided in certain embodiments. When a new service is created for the GR partition, external configurations in the AAA or the PDSN, for example, are made to configure the new service IP address and direct subscriber sessions to the new service.

When the chassis is partitioned, care must be taken to ensure that a particular session uses all the resources from the same partition. In some embodiments, a configuration validation may be used to ensure that a session uses the resources from the same partition to avoid errors or resource imbalances that might otherwise occur.

In certain embodiments, the main change for the SRP protocol is the introduction of the partition concept. Instead of negotiating and setting a state for the whole chassis, SRP negotiates and sets a state for each partition. SRP link monitoring and AAA Server/BGP peer monitoring scheme does not need to be changed to accommodate this modification.

If there is any failure triggering SRP switchover, then all active partitions with the failed chassis will be activated in the other active chassis. The partition switchover may be revertible on command, in which case intervention is required to switch back to a particular partition. The reason for not implementing an automatic switchover, in certain embodiments, back to the original chassis is that it may cause undesirable oscillating switchover in certain failure scenarios. When a switchover happens due to a failure, the network operators are given a chance to properly identify and resolve the issue before the partition is switched back. During a software upgrade, both partitions may be moved (switchover or activated) to one chassis allowing the other chassis to be upgraded. After upgrade, both the partition can be moved to the upgraded chassis, and the other chassis also can be upgraded.

Figure 4:
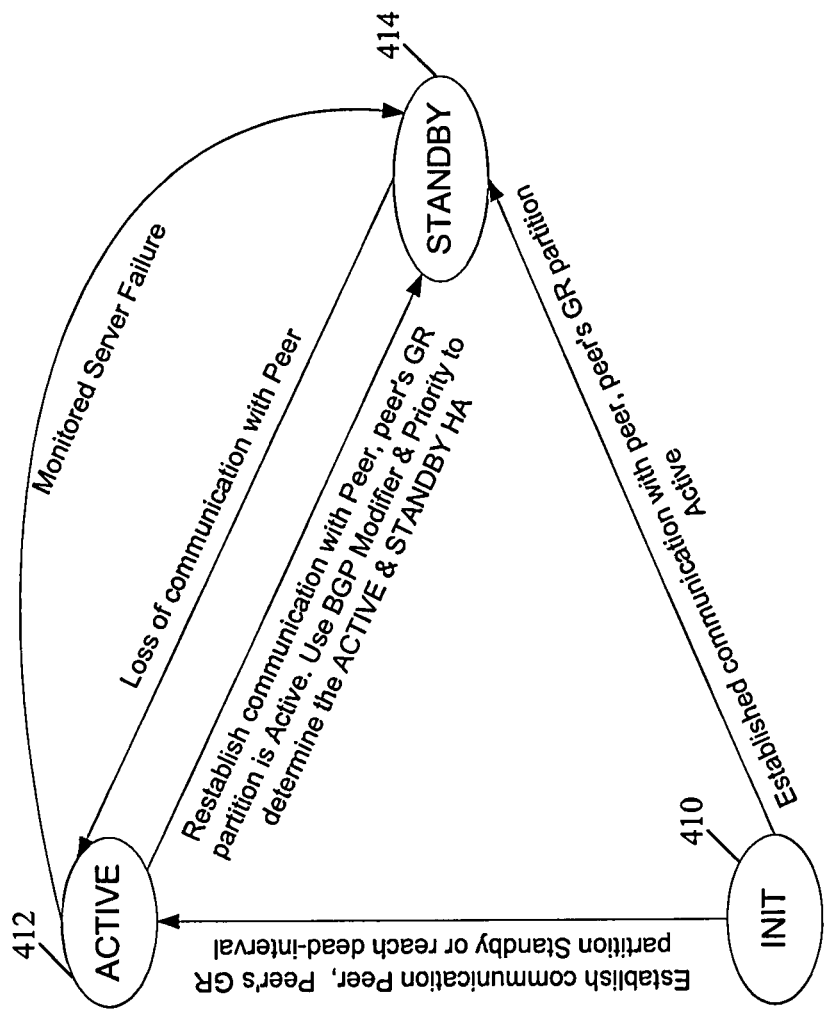
FIG. 4 is a state diagram for transitioning the states of partitions in a chassis in accordance with certain embodiments of the invention.

FIG. 4 illustrates state transitions for a partition in accordance with some embodiments of the invention. The states illustrated are Initialization state "Init" 410, Active state "Active" 412, and Standby state "Standby" 414. A chassis partition typically begins in Init 410 and may attempt to establish communication with one or more configured peer partitions. As shown in FIG. 2, from init a partition may transition to Active 412 or to Standby 414. If communication is established with a peer partition three possibilities may occur: 1) if the peer partition is Active 412, the init partition may transition to Standby 414; 2) if the peer partition is Standby 414, the partition may transition to Active 412; 3) if the peer partition is Init 410, the partition may become Active 412 or go into Standby 414 depending on a characteristic identifier of the peer partition. If the partition is Init 410, and no communication with a peer is established within a specified time interval, which may be called a dead-interval, the partition may transition to Active 412. In certain embodiments, any transition to Active 412 may only be performed if all monitored services are considered up and running.

If the partition is Active 412, then it can transition to Standby 414 depending on the circumstances. For example, if the partition receives a message from a peer partition that is also Active 412, two possibilities may occur. One possibility is the partition compares a routing attribute received from the peer partition with its own routing attribute and transitions to Standby 414 depending on a decision criteria or rule set. In certain embodiments, the routing attribute comes from BGP router and may be a BGP modifier. In other embodiments an attribute contention mechanism exists. The attribute contention mechanism is utilized when the attributes being compared are equal to one another. The attribute contention mechanism may defer to another attribute to determine which partition should change to Standby 414. Another possibility, in some embodiments, is the partition is Active 412, but a monitored server failure (e.g., an internal software error) occurs and the partition transitions to Standby 414 notifying the peer partition of its transition intentions.

If the partition is in Standby 414, it may transition to Active 412 depending on the circumstances. The partition may transition to Active 412 if it receives a message from a peer partition that is transitioning to Standby 414 due to a monitoring failure. Another possibility is the partition does not receive a message from an Active corresponding partition within a dead-interval, and the partition transitions to Active 412.

Figure 5:
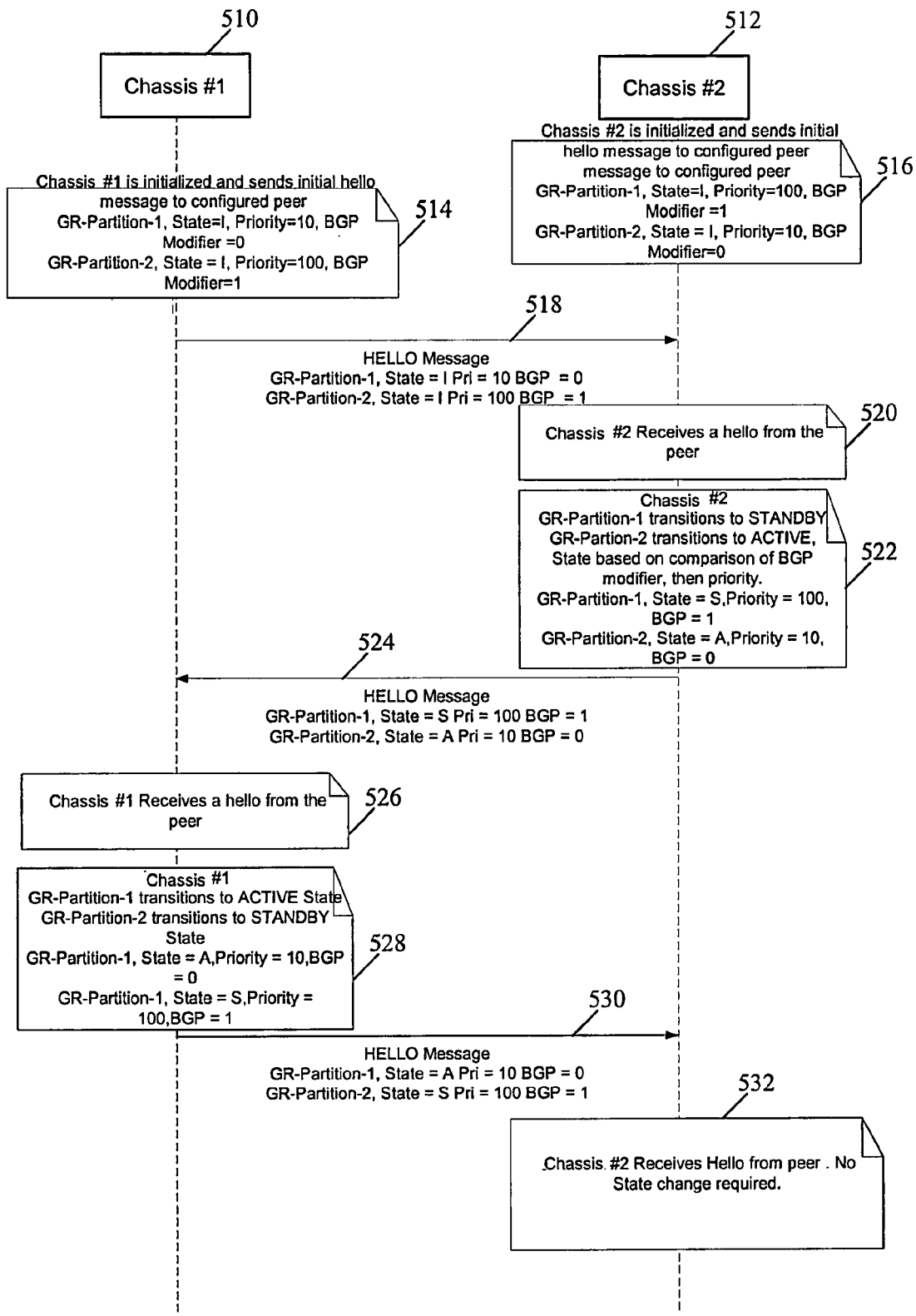
FIG. 5 is a signaling diagram for a state transition in accordance with certain embodiments of the invention.

FIG. 5 is an illustration of a state transition and signaling diagram for a dual chassis initialization scenario in accordance with certain embodiments of the invention. FIG. 5 includes a chassis #1 510 and a chassis #2 512, which both include two partitions. In some embodiments, more partitions can be implemented on a chassis, as one practiced in the field would be able to modify a chassis to include additional partitions. Chassis #1 510 and Chassis #2 512, when coming online for the first time, are in an initialization state that includes both partitions. Each partition in 514 and 516 has a priority and BGP modifier to determine the next state transition. A protocol is used to communicate a hello message 518 from chassis #1 510 to chassis #2 512. The message can come from either chassis, but the first message received by a chassis initiates a state transition, as in 520. Chassis #2 512 in 522 transitions partition 1 to standby and partition 2 to active. This transition is based on a comparison of the BGP modifiers and the priority at each chassis. The change of state information is communicated in a hello message 524. In 526, chassis #1 510 receives the hello message from chassis #2 512. Chassis #1 510 transitions partition 1 to active and partition 2 to standby in 528. The state change information is sent in a hello message 530. Chassis #2 512 receives the hello, but no state change is needed in 532.

In some embodiments, the initialization message can be exchanged at the same time or nearly the same time and the changes at either side can be based on the BGP modifier and priority information received from the other chassis. In certain embodiments, the priority information of the partition may not be required. Each active chassis makes one partition active and the other partition standby and this can be arbitrarily determined by a chassis and verified during a SRP protocol handshake with corresponding partitions.

Figure 6:
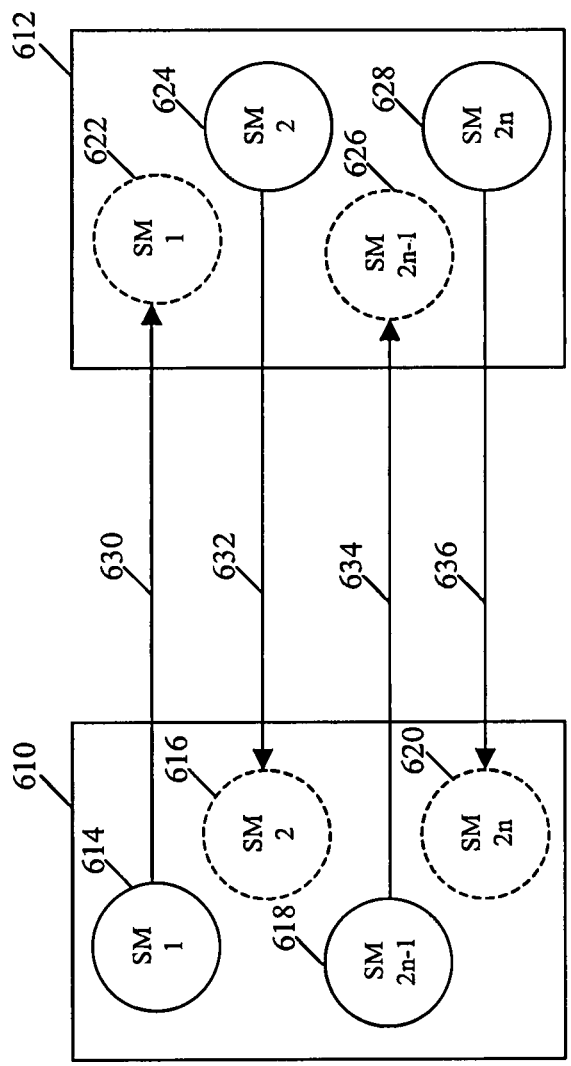
FIG. 6 is a schematic diagram regarding updating session information in an active-active chassis in accordance with certain embodiments of the invention.

FIG. 6 illustrates session manager state and checkpoint flow messaging between two chassis. Chassis #1 610 includes a number of session manager instances 614, 616, 618, and 620. Chassis #2 includes a corresponding number of session manager instances 622, 624, 626, and 628. The session managers control certain events relating to subscriber sessions and can be grouped based on instance number in some embodiments. In FIG. 6, odd instance numbered session managers are associated with partition 1 and even instance numbered of session managers are associated with partition number 2.

Session manager instances that are associated with an active partition (614, 618, 624, and 628 of FIG. 6) send checkpoint messages (630, 632, 634, and 636 of FIG. 6) to the session mangers of same instance number in the peer chassis. In some embodiments, a partition is active in only one chassis at any time. Checkpoint messages include information relating to the subscriber sessions or calls that the active session manager is handling. The information may include such things as fields to indicate which session the data pertains and whether to overwrite a session already stored on the standby partition. Checkpoint messages can create and delete redundant sessions as well as periodically update subscriber session statistics on the standby partition. The Checkpoint messages may include the information needed to recreate a call on the standby partition if the standby partition were to transition to an active partition. A full checkpoint can overwrite the previous information about the subscriber session in the standby partition session manger. A micro checkpoint can used to make partial updates. An example of how the various types of messages can be composed is provided below:

SRP Messages
```
    struct vpnmgr_srp_msg_header
    {
        unsigned int srp_version;      /* SRP Version. */
        unsigned int type;         /* Packet Type. */
        unsigned int length;       /* Packet Length. */
        unsigned int magic;            /* Magic Number. */
        unsigned int auth_type;        /* Authentication Type. */
        /* Authentication Data. */
        vpnmgr_srp_union_value_t u;
        /*ADD NEW MEMBERS HERE*/
        unsigned int unused1;
        unsigned int unused2;
    };
    enum SRPMsgType
    {
        SRP_MSG_TYPE_HELLO = 1,
        SRP_MSG_TYPE_CONFIG = 2,
        SRP_MSG_TYPE_RESOURCE = 3
    };
```

-continued

```
Checkpoint Messages
    typedef struct sess_gr_msg_session_header
    {
        sess_gr_msg_type_t type:8;
        unsigned int    length:24;          /* session info length. */
        unsigned int    callid;             /* callid of the session. */
    #if _BYTE_ORDER == _BIG_ENDIAN  /* mips */
        unsigned int    reserved1 : 28;     /* reserved for
                                               future use */
        unsigned int    compr_type : 4;
    #elif _BYTE_ORDER == _LITTLE_ENDIAN  /* x86 */
        unsigned int    compr_type : 4;
        unsigned int    reserved1 : 28;     /* reserved for
                                               future use */
    #endif
        unsigned int    reserved2;          /* reserved for
                                               future use */
        unsigned int    reserved3;          /* reserved for
                                               future use */
        unsigned int    reserved4;          /* reserved for
                                               future use */
        char            data[0];
    } sess_gr_msg_session_header_t;
    typedef enum sess_gr_msg_type
    {
        SMGR_GR_MACRO_CHECKPOINT   = 1,
        SMGR_GR_MICRO_CHECKPOINT   = 2,
        SMGR_GR_TABLE_VPN          = 3,
        SMGR_GR_TABLE_SVC          = 4,
        SMGR_GR_HEART_BEAT         = 5,
        SMGR_GR_SYNC               = 6,
        SMGR_GR_SYNC_ACK           = 7
    } sess_gr_msg_type_t;
```

Figure 7:
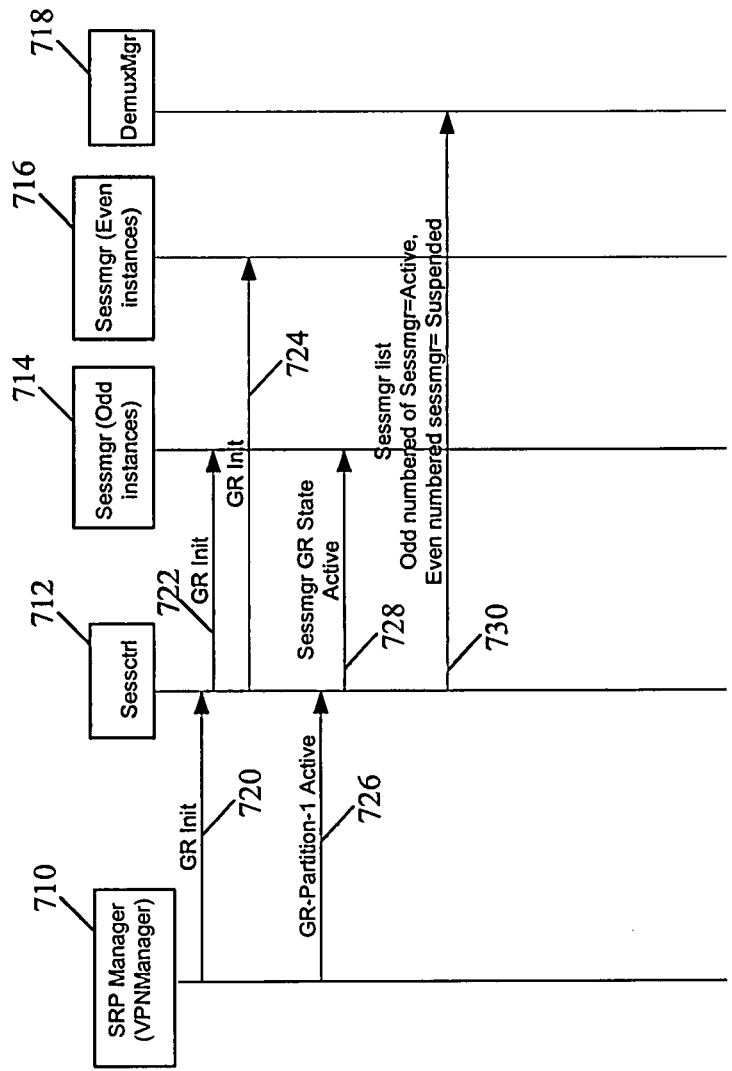
FIG. 7 is a signaling diagram for event passing in accordance with certain embodiments of the invention.

FIG. 7 illustrates partition setup and event passing signaling in accordance with certain embodiments of the invention. The logical functions included in FIG. 7 are a VPN Manager 710, a session controller 712, odd session manager instances 714, even session manager instances 716, and a demux-manager 718. VPN Manager can be a software task in the chassis, which manages IP interfaces and IP pool configuration. There can be one VPN Manager task running for each configured context.

Session controller 712 can be a software task, which is responsible for managing Session manager instances. There is one session controller running in the chassis, in some embodiments. Session controller 712 monitors the active partition for the chassis and can create and manage session manager instances to handle subscriber session tasks. Illustrated session controller 712 can use a "SESSMGR_STATE_SUSPENDED" flag with session manager (Sessmgr) instances 716 sent to the standby partition. Additionally, session controller 712 can mask information about the partitions from the session manager instances 714 and 716. Session manger instances 714 and 716 can receive traffic flows from a demux-manager 718, which is configured by session controller 712. Demux-manager 718 can be a software-implemented internal router of data flows. In some embodiments, demux-manager 718 looks at incoming traffic and decides where the data should go within the partition for processing. Demux-manager is the signaling demultiplexing task in the chassis. There can be a demux-manager task running for each service type. The main purpose of this software task is to handle incoming new sessions and assign the session to a session manager instance. The demux-manager can also be used for load balancing within a partition.

A geographic redundancy initialization message 720 is sent from VPN manager 710 to session controller 712 and provides information on the number of session managers to initialize on the partitions. As shown in FIG. 6, the odd and even session manager instances exist on both chassis. Another geographic redundancy initialization message 722 is used to setup the instances of session manager that will be active on each partition. Geographic redundancy initialization message 724 is used to setup the instances of session manager that will be standby on each partition. VPN Manager 710 sends an active partition message 726 that provides instructions to session controller 712 to activate a particular partition or partitions on a chassis. Session controller 712 uses a session manager state activate message 728 to activate instances residing in the activated partition(s) selected by VPN manager 710. Session controller 712 provides demux-manager 718 with a session manager list message 730 that identifies which session managers are active and which are suspended so the demux-manager can direct traffic flows accordingly. Additional session manager list messages can be provided to the demux-manager as changes occur in the partitions and there are switchover events.

In some embodiments, session managers are grouped based on the instance number (odd or even) and can be distributed among the central processing units (CPUs) with odd and even instance numbered session managers mixed in each CPU. This can provide better CPU utilization when one partition is active and other is standby on a single chassis because then a portion of each CPU's processing power is being used. Using an even number of session manger instances at any time in the chassis can allow for division of the session mangers into two mostly equal halves for the partitions to use. In some embodiments, such as where two chassis form a redundant pair, ten percent extra capacity is planned to support the Active-Active mode. Other embodiments, such as more than two active chassis are also possible and in that case other divisions of session managers might be used depending on the amount of capacity placed in reserve.

When setting up Active-Active redundancy mode groups, the amount of capacity each chassis can handle should be determined. When two chassis are used and a ten percent reserve capacity is planned, each chassis can then use 45 percent of its maximum capacity (number of sessions, call rate, and data throughput). In the event of a failure the other 45 percent of the subscriber sessions are transferred to the one active chassis making it 90 percent utilized. When one or more chassis are able to handle different call volumes because of their architecture, a dynamic load balancing mechanism may be used to distribute the call volume accordingly.

The reason for maintaining the reserve capacity, in some embodiments, is to handle the computational load needed in a switchover event. When a chassis fails, one or more chassis can transfer and recreate all sessions from the failed chassis. In the Active-Active mode, chassis are forced to recovery calls in one partition, while serving calls in another partition. Inter-chassis call recovery is CPU intensive. Additionally, the configuration may require additional contexts, services, and IP pools to support Active-Active mode. Some reserve capacity can be used to accommodate this overhead. In some embodiments, traps and event logs will be generated, when a chassis exceeds the specified percent of the capacity on a particular active partition. Services may be set to go to an overload state and reject or redirect new incoming sessions when the load exceeds the specified percent of the capacity on a particular active partition.

Using separate ingress and egress contexts for each partition may result in doubling the number of contexts within the chassis. Since a VPN Manager is started for each context, in certain embodiments, it could have major impact on the system capacity if the number of egress/ingress contexts in the system is large. Customers who are already planning to use large number of services (e.g., 256 services) may share these services between the partitions. Contexts (e.g., Ingress, Egress, and AAA) can be created and assigned to each partition on a chassis. However, having two or more AAA contexts in the chassis could be an issue for certain configurations, such as when the chassis is using domain configuration. This is an issue because the domain should be unique across the contexts. In some embodiments, different IP interfaces are assigned within a context to the partitions. For example, when a single chassis runs both active partitions, there may be two active NAS-IP-ADDRESS available. Sessions may start using different NAS-IP-ADDRESS.

Figure 8:
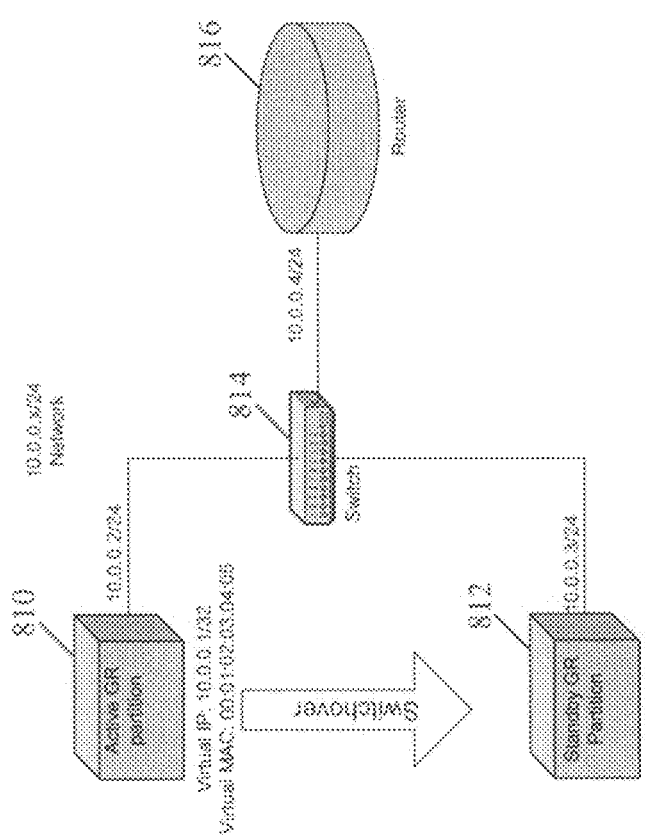
FIG. 8 is a schematic diagram for operation over a common IP subnet in accordance with certain embodiments of the invention.

In some embodiments, dynamic routing protocols, such as BGP, are not used but an Active-Active chassis redundancy is desired. The dynamic routing protocols are used to advertise the new route of the same loopback address so messages from network devices are correctly forwarded over the new route, but the change is not apparent to network devices because the same IP address is used. Another approach is to use a media access control (MAC) address transfer in some embodiments. This MAC address approach can provide operation over a common IP subnet absent dynamic routing protocols. An example of this is when two chassis are connected by the same physical connection to the network and are located in the same geographic region. This implementation involves configuring the SRP virtual MAC address to act as a subnet SRP-activated loopback address, in some embodiments. This allows the standby chassis partition to seamlessly assume an active role in handling call flows. FIG. 8 illustrates a setup 800 for operation over a common IP subnet. Setup 800 includes an active partition 810, a standby partition 812, a switch 814, and a router 816. The IP subnet in FIG. 8 is network 10.0.0.x/24 in which active partition 810 and standby partition 812 reside. After a switchover, standby partition 812 will become active and network devices will continue to use the same virtual MAC address and the currently active partition will respond to requests in the shared loopback IP addresses. This provides for fast standby to active transitions because the virtual MAC address does not change during the switchover.

In the event of an SRP link failure, both chassis partitions will attempt to become active in embodiments involving a common IP subnet. This can possibly lead to a connectivity issue because both chassis will attempt to send a request for the virtual MAC address on the assigned port. If a response is received from the peer, the standby chassis partition does not transition to active, and assumes that the peer is functioning normally.

Figure 9:
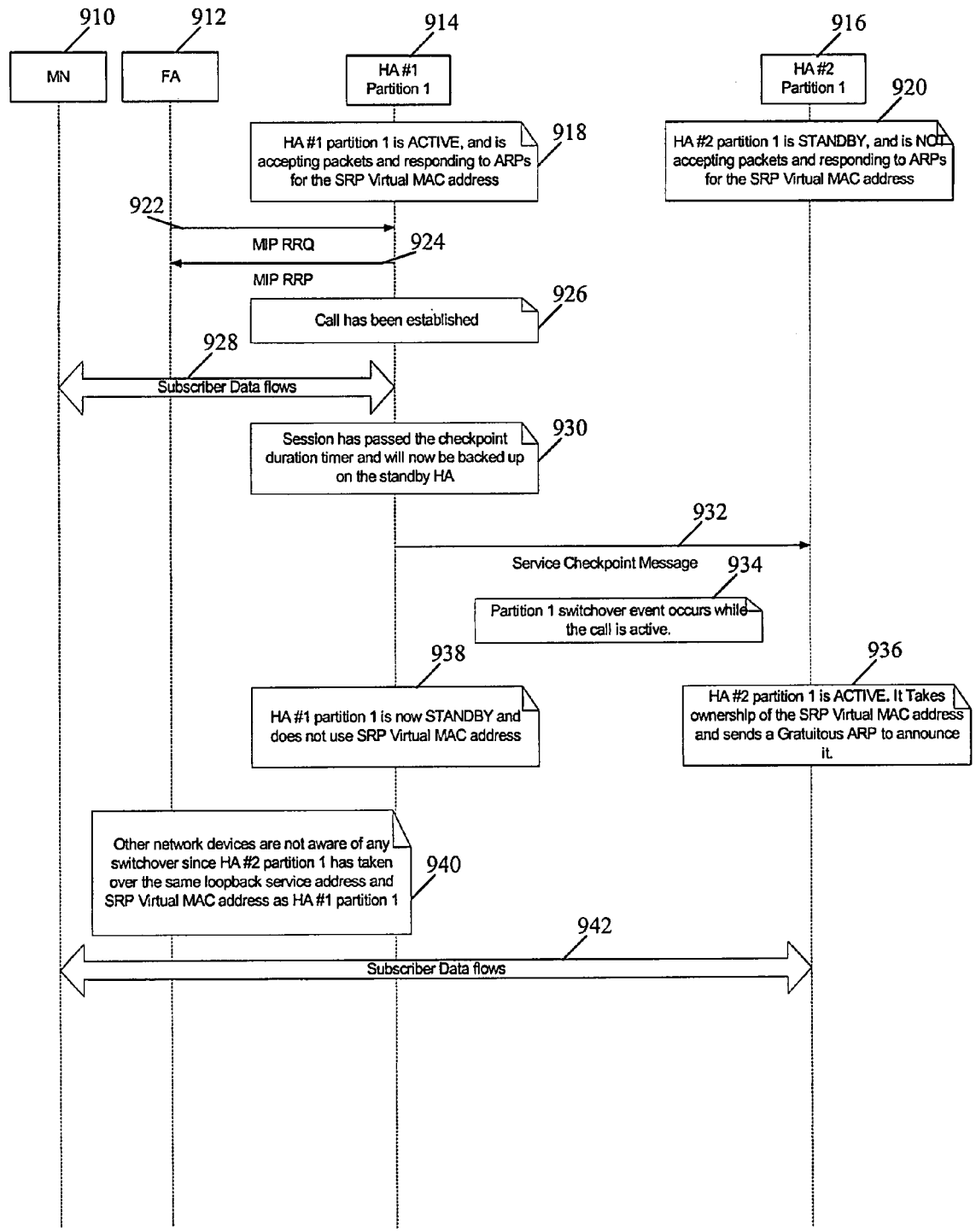
FIG. 9 is a signaling diagram for a switchover event involving operation over a common IP subnet.

FIG. 9 illustrates signaling involved with using a common IP subnet. FIG. 9 illustrates logical entities including mobile node 910, foreign agent 912, chassis #1 partition 914, and chassis #2 partition 916. In 918, chassis #1 partition 914 is active and is accepting packet flows and responding to address resolution protocol (ARP) requests for the virtual MAC address of the partition. In 920, chassis #2 partition 916 is in a standby mode and waiting for a switchover event to begin handling traffic flows and responding to ARP requests for the virtual MAC address. A registration request message 922 is sent from foreign agent 912 to setup a new subscriber session. Registration request message 922 is sent to the active partition 914 because that is the partition responding to requests. Chassis #1 partition 914 begins setting up for the call and responds with a registration reply message 924 to indicate a subscriber session can be established. In 926, a call is established and in 928 subscriber data begins to flow from mobile node 910 to the active partition 914.

In 930, a timer triggers a checkpoint message backup of session information stored in chassis #1 partition 914 to be mirrored onto chassis #2 partition 916. A service checkpoint message 932 is used to carry the information to mirror the established subscriber sessions on chassis #1 partition 914. In some embodiments, only updates and changes are sent in service checkpoint message 932. In other embodiments, all information needed to maintain active subscriber sessions is sent in service checkpoint message 932. At 934, a switchover event occurs between chassis #1 partition 914 and chassis #2 partition 916. The switchover event can be triggered by a failure or by a planned event. After the switchover in 936, chassis #2 partition 916 is active and takes ownership of the virtual MAC address and sends a gratuitous ARP announcement to announce the MAC address. Chassis #1 partition 914 is in a standby mode 938 and relinquishes use of the virtual MAC address. Because chassis #2 partition 916 assumes ownership over the same loopback service address and virtual MAC address as chassis #1 partition 914, other network devices are not aware of any switchover in 940. Additionally, since chassis #2 916 was a mirror image of active chassis #1 partition 914 prior to the switchover, the subscriber sessions are not dropped and the switchover is seamless. In 942, subscriber data flows from mobile node 910 to chassis #2 partition 916.

In some embodiments, an IP pool hold timer is used that allows a user who has disconnected to obtain the same IP address allocation upon reconnection. Accordingly, IP pool hold timer information is transmitted indirectly between the active and standby partitions through session checkpoint messaging. On the standby partition, the standby session allocates the same IP address from the same IP pool. When the call is released this information is transmitted to the standby partition through a checkpoint message. The session is released on the standby partition and the address is transitioned from "used" to "hold" on both the active and standby partitions. The amount of time the IP address is held by the partitions can be set by the user or can be dynamically altered depending on the availability of resources.

In some embodiments, software needed for implementing a process includes a high level procedural or an object-orientated language such as C, C++, C#, Java, or Perl. The software may also be implemented in assembly language if desired. Packet processing implemented in a chassis may include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. In some embodiments, an access gateway, a packet data serving node (PDSN), a foreign agent (FA), or home agent (HA) can be implemented on a Starent Networks, Corp. of Tewksbury, Mass. ST16 or ST40 Intelligent Mobile Gateway (IMG). Other types of devices can also be used in other embodiments are a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF).

In certain embodiments, one or more of the above-mentioned other types of devices are integrated together or provided by the same device. For example, an access network can be integrated with a PDSN. A chassis can include a PDSN, a FA, a HA, a GGSN, a PDIF, an ASNGW, a UPE, an IP Gateway, an access gateway, or any other applicable access interface device.

In some embodiments, a ST16 IMG can be used to provide a fast handoff interface between devices. The ST16 IMG can implement many types of logical or functional devices such as a PDSN, GGSN, PDIF, ASNGW, FA, and HA. The ST16 IMG includes slots for loading application cards and line cards. A midplane can be used in the ST16 IMG to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the ST16 IMG implemented by establishing inter-card communications between application cards and line cards. The control bus interconnects the control and management processors within the ST16 MG. The ST16 IMG management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The ST16 IMG supports at least two types of application cards: a switch processor card and a packet accelerator card. The switch processor card serves as a controller of the ST16 IMG and is responsible for such things as initializing the ST16 IMG and loading software configurations onto other cards in the ST16 IMG. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the ST16 IMG provide input/output connectivity and can also provide redundancy connections as well.

The operating system software can be based on a Linux software kernel and run specific applications in the ST16 IMG such as monitoring tasks and providing protocol stacks. The software allows ST16 IMG resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The ST16 IMG's software can be divided into a series of tasks that perform specific functions. These tasks communicate with each other as needed to share control and data information throughout the ST16 IMG. A task is a software process that performs a specific function related to system control or session processing. Three types of tasks operate within the ST16 IMG in some embodiments: critical tasks, controller tasks, and manager tasks. The critical tasks control functions that relate to the ST16 IMG's ability to process calls such as ST16 IMG initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on an ST16 IMG include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the ST16 IMG by monitoring the various software and hardware components of the ST16 IMG. Recovery control task subsystem is responsible for executing a recovery action for failures that occur in the ST16 IMG and receives recovery actions from the high availability task subsystem. Shared configuration task subsystem provides the ST16 IMG with an ability to set, retrieve, and receive notification of ST16 IMG configuration parameter changes and is responsible for storing configuration data for the applications running within the ST16 IMG. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the ST16 IMG, which include creating separate VPN contexts, starting IP services within a VPN context, managing IP pools and subscriber IP addresses, and distributing the IP flow information within a VPN context. In some embodiments, within the ST16 IMG, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A system that communicates with a second chassis having functionalities for causing wireless communications to be directed to and/or from mobile nodes, the second chassis having an active partition and a standby partition, the system comprising:
    a first chassis having functionalities for causing wireless communications to be directed to and/or from mobile nodes, the first chassis including a first partition and a second partition;
    wherein the first partition of the first chassis is in an active state and is configured to accept new subscriber sessions, provide mobility management for a first plurality of mobile nodes, and send at least one update regarding the first plurality of mobile nodes to the second chassis standby partition;
    wherein the second partition of the first chassis is in a standby state and is configured to receive updates from the second chassis active partition regarding a second plurality of mobile nodes and to maintain subscriber session information of the second plurality of mobile nodes corresponding to subscriber session information on the second chassis active partition, wherein the second partition of the first chassis is configured, when active, to provide mobility management for the second plurality of mobile nodes,
    wherein the first partition of the first chassis is a logical partition that maintains a first virtual IP network having a first set of resources that include a first range of IP addresses for assignment to the first plurality of mobile nodes, and the active partition of the second chassis is a logical partition that maintains a second virtual IP network having a second set of resources that include a second range of IP addresses for assignment to the second plurality of mobile nodes that is different from the first plurality of mobile nodes,
    wherein the first range of IP addresses is different from the second range of IP addresses and the first range of IP addresses and the second range of IP addresses are derived from a common pool of IP addresses including dynamic IP addresses, and
    wherein the first partition of the first chassis monitors (1) dynamic routing peer connectivity of the first chassis, (2) authentication, authorization, and accounting (AAA) server connectivity of the first chassis, and (3) internal software state of the first chassis and initiates a switchover event activating the standby partition of the second chassis by allowing the standby partition of the second chassis to transition to active state when the monitored internal software state or at least one of the dynamic routing peer connectivity and the AAA server connectivity fails.

2. The system of claim 1, wherein the first chassis is implementing an active home agent in the first partition and a standby home agent in the second partition.

3. The system of claim 1, further comprising the first chassis communicating with the second chassis using a service redundancy protocol (SRP), which is based on a transfer control protocol (TCP).

4. The system of claim 1, wherein the first partition includes an ingress context and an egress context, wherein the ingress context and the egress context each include an interface.

5. The system of claim 1, wherein the first chassis includes an authentication, authorization, and accounting (AAA) context and a service redundancy protocol (SRP) context.

6. The system of claim 1, wherein the first chassis includes a session controller to monitor the first partition of the first chassis and a session manager instance to handle subscriber session tasks.

7. The system of claim 1, wherein the second partition of the first chassis transitions from the standby state to an active state and begins receiving data corresponding to subscriber session information that the second partition maintained while in a standby state.

8. The system of claim 1, wherein the first partition of the first chassis uses a loopback address that is common to both partitions.

9. The system of claim 1, in combination with the second chassis having the active partition and the standby partition, wherein the standby partition of the first chassis provides redundancy for the active partition of the second chassis, and the standby partition of the second chassis provides redundancy for the active partition of the first chassis.

10. A method comprising:
    receiving subscriber session traffic at a first partition in an active state in a first chassis from a first plurality of mobile nodes;
    providing mobility management to the first plurality of mobile nodes using information in the first partition of the first chassis;
    sending a message to update a first partition in a standby state in a second chassis with information from the first partition in the first chassis regarding the first plurality of mobile nodes;
    receiving a message to update a second partition in a standby state in the first chassis with information regarding a second plurality of mobile nodes that are being provided mobility management from a second partition in an active state in the second chassis; and
    maintaining subscriber session information of the second plurality of mobile nodes in the second partition of the first chassis that corresponds to subscriber session information of the second plurality of mobile nodes on the second partition of the second chassis,
    wherein the first partition of the first chassis is a logical partition that maintains a first virtual IP network having a first set of resources that include a first range of IP addresses for assignment to the first plurality of mobile nodes, and the second partition of the second chassis is a logical partition that maintains a second virtual IP network having a second set of resources that include a second range of IP addresses for assignment to the second plurality of mobile nodes that is different from the first plurality of mobile nodes,
    wherein the first range of IP addresses is different from the second range of IP addresses and the first range of IP addresses and the second range of IP addresses are derived from a common pool of IP addresses including dynamic IP addresses, and wherein the first partition of the first chassis monitors (1) dynamic routing peer connectivity of the first chassis, (2) authentication, authorization, and accounting (AAA) server connectivity of the first chassis, and (3) internal software state of the first chassis and initiates a switchover event activating the first partition of the second chassis by allowing the first partition of the second chassis to transition to active state when the monitored internal software state or at least one of the dynamic routing peer connectivity and the AAA server connectivity fails.

11. The method of claim 10, further comprising:

initiating a switchover event where the first partition in the second chassis advertises a common loopback address that is shared with the first partition in the first chassis; and determining which partition will transition to active by exchanging hello messages with attributes.

12. The method of claim 10, further comprising providing an ingress context and an egress context in the first chassis.

13. The method of claim 10, further comprising communicating between the first chassis and the second chassis using a service redundancy protocol (SRP), which is based on a transfer control protocol (TCP).

14. The method of claim 10, further comprising providing a session controller to monitor the first partition and a session manager instance to handle subscriber session tasks.

15. The method of claim 14, further comprising providing a suspend state for the session manage instance in a standby partition.

16. The method of claim 10, further comprising providing a virtual media access control (MAC) address for operation over a common IP subnet.

17. The method of claim 16, further comprising holding an IP address for a user who disconnected for an amount of time determined by an IP hold timer.

18. Logic encoded on one or more non-transient tangible media for execution and when executed operable to:

receive subscriber session traffic at a first partition in an active state in a first chassis from a first plurality of mobile nodes;

provide mobility management to the first plurality of mobile nodes using information in the first partition of the first chassis;

send a message to update a first partition in a standby state in a second chassis with information from the first partition in the first chassis regarding the first plurality of mobile nodes;

receive a message to update a second partition in a standby state in the first chassis with information regarding a second plurality of mobile nodes that are being provided mobility management from a second partition in an active state in the second chassis; and maintain subscriber session information of the second plurality of mobile nodes in the second partition of the first chassis that corresponds to subscriber session information of the second plurality of mobile nodes on the second partition of the second chassis, wherein the first partition of the first chassis is a logical partition that maintains a first virtual IP network having a first set of resources that include a first range of IP addresses for assignment to the first plurality of mobile nodes, and the second partition of the second chassis is a logical partition that maintains a second virtual IP network having a second set of resources that include a second range of IP addresses for assignment to the second plurality of mobile nodes that is different from the first plurality of mobile nodes, wherein the first range of IP addresses is different from the second range of IP addresses and the first range of IP addresses and the second range of IP addresses are derived from a common pool of IP addresses including dynamic IP addresses, and wherein the first partition of the first chassis monitors (1) dynamic routing peer connectivity of the first chassis, (2) authentication, authorization, and accounting (AAA) server connectivity of the first chassis, and (3) internal software state of the first chassis and initiates a switchover event activating the first partition of the second chassis by allowing the first partition of the second chassis to transition to active state when the monitored internal software state or at least one of the dynamic routing peer connectivity and the AAA server connectivity fails.

19. The logic of claim 18, further comprising providing a virtual media access control (MAC) address for operation over a common IP subnet.

* * * * *